Patented Sept. 2, 1952

2,609,376

UNITED STATES PATENT OFFICE 2,609,376

REACTION PRODUCTS OF NUCLEARLY POLYHALOGENATED QUINONOID COMPOUNDS AND TRIALKYL PHOSPHITES AND PROCESS OF MAKING SAME

Elbert C. Ladd and Merlin P. Harvey, Passaic, N. J., assignors to United States Rubber Company, New York, N. Y., a corporation of New Jersey No Drawing. Application September 20, 1949, Serial No. 116,844

12 Claims. (Cl. 260—396)

This invention relates to a new class of compounds, namely, the products of the reaction of nuclearly polyhalogenated quinone-type compounds, i. e., either quinones themselves, or, quinones wherein one oxygen has been replaced by two halogen atoms, with trialkyl phosphites, and a method of making the same.

We have discovered that such nuclearly polyhalogenated quinones or the like will react with the trialkyl phosphites in such a manner that the phosphorus atom of the trialkyl phosphite becomes attached to one of the carbon atoms in the nucleus of the nuclearly polyhalogenated quinone reactant, the —P(O)(OR)₂ group (where R is alkyl) replacing one of the nuclear halogens.

It was particularly surprising to find that these chemicals would react in this manner since it is known that phosphines, such as triphenylphosphine, react with quinones, e. g., p-benzoquinone, at the carbonyl oxygen atom. In our process, in contrast, the carbonyl oxygen of the polyhalogenoquinone remains intact. We have further found that the triaryl phospites are inoperable in our process, although the trialkyl phosphites are highly reactive.

The polyhalogenated quinone-type compounds which are operable in our invention include the polychlorinated and polybrominated quinones, particularly the para- and ortho-benzoquinones and the naphthoquinones. Illustrative of such compounds are those of the following type formulae, where X is chlorine or bromine:

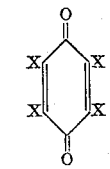 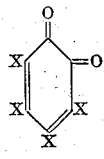

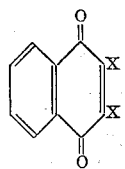 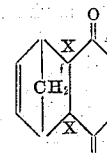

and

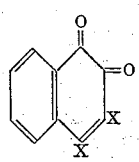

Especially preferred among such compounds are the chlorinated quinones, particularly tetrachloro-p-benzoquinone and 2,3-dichloro-1,4-naphthoquinone.

Instead of the polyhalogenated quinones themselves, we may use derivatives which may be considered as being formed by replacement of one of the quinonoid oxygen atoms with two halogen (chlorine or bromine) atoms. It is well recognized in the art that such compounds behave in many respects like the quinones themselves. In our invention, we use such derivatives which contain a plurality of nuclear halogen (chlorine or bromine) atoms in addition to the two which replace the quinonoid oxygen atom. Examples of derivatives of the type just mentioned are compounds having the formulae:

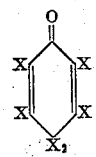

and

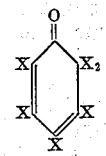

The two compounds just portrayed are known as hexachloro-2,5-cyclohexadiene-1-one and hexachloro-2,4-cyclohexadiene-1-one, respectively.

Exceptionally meritorious polyhalogenated quinone-type compounds useful in the practice of our invention are selected from the group consisting of tetrachloro-p-benzoquinone, 2,3-dichloro-1,4-naphthoquinone and hexachloro-2,5-cyclohexadiene-1-one (hexachlorophenol).

Any trialkyl phosphite may be used in practicing our invention. We prefer to use the trialkyl phosphites wherein the alkyl groups contain from 1 to 6 carbon atoms, such as methyl, ethyl, n-propyl, isopropyl, n-butyl, etc. The three alkyl groups are generally identical.

The course of the reaction of our invention can be illustrated by the synthesis of a halogenoquinone-phosphonic acid ester, one of the preferred classes of compounds obtainable by my process:

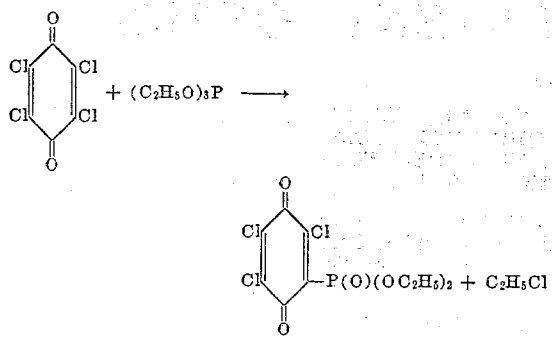

It is noteworthy that in our process, despite the multiplicity of nuclear halogen atoms in the polyhalogenated quinone reactant, the trialkyl phosphite reactant reacts substantially exclusively with one only of these halogen atoms whereby a monophosphorus-substituted halogeno-quinone is obtained as virtually the sole product.

The reactions of our invention are carried out by slowly mixing approximately 1 mol of the polyhalogeno-quinone with 1 or more mols (usually 1 to 5 incl.) of the trialkyl phosphite. The use of an amount of the phosphite in excess of that required for a 1:1 ratio appears to offer no advantage. The reactions are, in general, markedly exothermic and little additional heating is ordinarily required to attain adequate reaction temperatures, e. g., from 40° to 100° C., to complete the reaction within 2–10 hours. The reaction products are, in the main, high-boiling liquids or solids which are best isolated by concentration of the reaction mixture in vacuo to remove unreacted starting materials. The residual products are of sufficient purity for most applications such as in the formulation of wetting agents, lube-oil additives and anti-oxidants.

The following examples disclose my invention in more detail.

*Example 1*

Thirty-three and twenty-three hundredths grams (0.2 mol) of triethyl phosphite are added dropwise in the course of 2 hours to an agitated dispersion of 20 grams (0.0578 mol) of tetrachloro-p-benzoquinone in 50 ml. of dioxane. The reaction is exothermic and a temperature of 60–75° C. is maintained by adjusting the rate of addition of the triethyl phosphite. The evolution of ethyl chloride from the reaction mixture is observed throughout the reaction. When the addition of the triethyl phosphite has been completed, the reaction mixture is concentrated in vacuo (210° C./1.0 mm.) to yield 31 g. of residual liquid which is considered to be the new compound, diethyl trichloro-p-benzoquinone-phosphonate, $n_D^{20}$ 1.5282; chlorine=31.58% (theory=30.61%); phosphorus=8.13% (theory=8.91%).

*Example 2*

In the manner of Example 1, 33.2 g. (0.2 mol) of triethyl phosphite are added dropwise, in 1.5 hours, to a mixture of 22.7 g. (0.1 mol) of 2,3-dichloro-1,4-naphthoquinone and 150 ml. of dioxane. Ethyl chloride is evolved during the addition of the triethyl phosphite, and after the addition is complete the mixture is heated at reflux for 2.5 hours. Upon concentration of the mixture in vacuo at 200° C./1.0 mm., 40.5 g. of residual liquid are obtained which is largely a new compound, considered to be diethyl 3-chloro-1,4-naphthoquinone-2-phosphonate; phosphorus=9.33% (theory=9.43%).

*Example 3*

To a solution of 30 g. (0.1 mol) of hexachloro-2,5-cyclohexadiene-1-one (m. 106° C., also known as high-melting hexachlorophenol) in 100 ml. of dioxane is slowly added, with stirring, 16.6 g. (0.1 mol) of triethyl phosphite. After the exothermic reaction is complete, the mixture is poured into water and the precipitate is filtered off and dried. The latter amounts to 41.8 g. of a new compound, considered to be a diethyl pentachloro-2,5-cyclohexadiene-1-one phosphonate, m. 108–111° C. after one recrystallization from ethanol; phosphorus=7.55% (theory for $C_{10}H_{10}O_4Cl_5P$=7.70%); chlorine=45.66% (theory=44.05%).

*Example 4*

Tri(2-chloroethyl) phosphite (26.95 g.) is added dropwise during the course of one hour to a well stirred solution of 30.08 g. of hexachlorophenol in 40 ml. of dioxane. The reaction is exothermic and the temperature of the mixture is maintained at 55 to 60° C. by regulating the rate of addition of the phosphite. The solvent is removed from the mixture by distillation. The residue (48 g.) is a red liquid which soon crystallizes to a cream-colored solid. The melting point of this product after recrystallization from a mixture of hexane and absolute ethanol is 67° to 68.5° C.; phosphorus, 6.41%; chlorine, 53.11% (calculated for $C_{10}H_8Cl_7O_4P$=P, 6.57%; Cl, 52.67%).

Having thus described our invention, what we claim and desire to protect by Letters Patent is:

1. A compound having the structure obtained by replacement of a single nuclear halogen atom in a nuclearly polyhalogenated quinone-type compound selected from the group consisting of nuclearly polyhalogenated mononuclear and binuclear quinones and such nuclearly polyhalogenated quinones in which one of the quinonoid oxygen atoms is replaced with two halogen atoms, said quinone-type compound containing halogen selected from the group consisting of chlorine and bromine, with a —P(O)(OR)₂ group where R is an alkyl group of from 1 to 6 carbon atoms.

2. A dialkyl trichloro-p-benzoquinonephosphonate, the alkyl groups of which contain from 1 to 6 carbon atoms.

3. Diethyl trichloro-p-benzoquinonephosphonate.

4. A dialkyl chloronaphthoquinone phosphonate, the alkyl groups of which contain from 1 to 6 carbon atoms.

5. Diethyl 3-chloro-1,4-naphthoquinone-2-phosphonate.

6. A dialkyl pentachloro-2,5-cyclohexadiene-1-one phosphonate, the alkyl groups of which contain from 1 to 6 carbon atoms.

7. A diethyl pentachloro-2,5-cyclohexadiene-1-one phosphonate.

8. The process which comprises commingling a nuclearly polyhalogenated quinonoid compound selected from the class consisting of nuclearly polyhalogenated quinones, and nuclearly polyhalogenated quinones in which one quinonoid oxygen is replaced by two halogen groups, with a trialkyl phosphite, subjecting the resulting mixture to elevated temperature until reaction is complete and isolating a reaction product wherein a dialkyl phosphono group has replaced one of the nuclear halogens of said compound from the resulting reaction mixture.

9. The process which comprises commingling tetrachloro-p-benzoquinone with a trialkyl phosphite, subjecting the resulting mixture to elevated temperature until reaction is complete and isolating a dialkyl trichloro-p-benzoquinonephosphonate from the resulting reaction mixture.

10. The process which comprises commingling 2,3-dichloro-1,4-naphthoquinone and a trialkyl phosphite, subjecting the resulting mixture to elevated temperature until reaction is complete and isolating a dialkyl 3-chloro-1,4-naphthoquinone-2-phosphonate from the resulting reaction mixture.

11. The process which comprises commingling hexachloro-2,5-cyclohexadiene-1-one and a trialkyl phosphite, subjecting the resulting mixture to elevated temperature until reaction is complete and isolating a dialkyl pentachloro-2,5-cyclohexadiene-1-one phosphonate from the resulting reaction mixture.

12. The process of claim 8 wherein at least one mol of trialkyl phosphite is employed per mol of said nuclearly polyhalogenated compound and wherein the reaction is effected at a temperature of from 40° to 100° C.

ELBERT C. LADD.
MERLIN P. HARVEY.

No references cited.